United States Patent
Kang et al.

(10) Patent No.: US 7,535,775 B2
(45) Date of Patent: May 19, 2009

(54) PAGE BUFFER AND A METHOD FOR DRIVING THE SAME IN A NONVOLATILE MEMORY DEVICE

(75) Inventors: Joo-Ah Kang, Seoul (KR); Jong-Hwa Kim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 222 days.

(21) Appl. No.: 11/586,599

(22) Filed: Oct. 26, 2006

(65) Prior Publication Data

US 2007/0103472 A1 May 10, 2007

(30) Foreign Application Priority Data

Nov. 10, 2005 (KR) ........................ 10-2005-0107755

(51) Int. Cl.
*G11C 7/10* (2006.01)
(52) U.S. Cl. .................... 365/189.05; 365/189.08; 365/230.08
(58) Field of Classification Search ............ 365/189.05, 365/189.08, 230.08
See application file for complete search history.

(56) References Cited

U.S. PATENT DOCUMENTS

| 6,650,588 B2 * | 11/2003 | Yamagata .................... 365/222 |
| 6,847,550 B2 | 1/2005 | Park |
| 6,996,014 B2 * | 2/2006 | Lee et al. ............... 365/189.05 |
| 7,061,813 B2 | 6/2006 | Lee |
| 2005/0146959 A1 | 7/2005 | Shiga |
| 2005/0152188 A1 | 7/2005 | Ju |
| 2006/0221695 A1 | 10/2006 | Kim |

FOREIGN PATENT DOCUMENTS

| KR | 10-2005-0072687 | 7/2005 |
| KR | 10-2005-0073293 | 7/2005 |

* cited by examiner

*Primary Examiner*—Son Dinh
*Assistant Examiner*—Nam Nguyen
(74) *Attorney, Agent, or Firm*—Volentine & Whitt, P.L.L.C.

(57) ABSTRACT

A page buffer may comprise of a latch connected to a sense node at a first contact point. The page buffer may also comprise of a sensing circuit connected to the sense node at a second contact point, the sensing circuit being configured to sense cell data of the sense node. The page buffer may also comprise of a switch circuit which electrically connects the first contact point with the second contact point after the first contact point is charged by the latch.

28 Claims, 4 Drawing Sheets

PAGE BUFFER AND A METHOD FOR DRIVING THE SAME IN A NONVOLATILE MEMORY DEVICE

BACKGROUND OF THE INVENTION

1. Field of the Invention

The present disclosure relates to a semiconductor memory device and, more particularly, to a nonvolatile memory device including a page buffer.

A claim for priority is made to Korean Patent Application No. 2005-107755 filed on Nov. 10, 2005, the disclosure of which is hereby incorporated by reference in its entirety.

2. Description of the Related Art

Generally, semiconductor memory devices may be categorized as volatile memory devices or nonvolatile memory devices. The volatile memory devices may be classified into dynamic random access memories (DRAMs) and static random access memories (SRAMs). The volatile semiconductor devices lose their data when their power supplies are interrupted, while nonvolatile memory devices retain their stored data even when their power supplies are interrupted. Thus, the nonvolatile memories are widely used to store retention-required data that is unaffected by power supply interruption. Nonvolatile memory may include memories such as, for example, mask read-only memories (MROMs), programmable read-only memories (PROMs), erasable programmable read-only memories (EPROMs), and electrically erasable programmable read-only memories (EEPROMs).

However, MROMs, PROMs, and EPROMs may have difficulty in rewriting stored data because read and write operations may not be freely conducted by users on these devices. On the other hand, EEPROMs are increasingly used in system programming that requires the continuous update of auxiliary memory devices. In particular, (flash) EEPROMs may be advantageous in their use as mass storage devices because their integration density may be higher than conventional EEPROMs. Among these flash EEPROMs, NAND-type flash EEPROM (hereinafter referred to as "NAND flash memory devices") may have much higher integration density than other flash EEPROMs.

The configuration of a conventional NAND flash memory device 10 is illustrated in FIG. 1. The NAND flash memory device 10 includes a memory cell array 11, a row decoder 12, and a page buffer circuit 14. The memory cell array 11 is a data storage unit which includes memory cells arranged at intersections of rows (i.e., wordlines) and columns (i.e., bitlines). A NAND string includes memory cells each storing 1-bit data or multi-bit data. The rows of the memory cell array 11 may be driven by the row decoder circuit 12, and the columns thereof may be driven by the page buffer circuit 14.

The page buffer circuit 14 programs/reads 1-bit data or multi-bit data (e.g., 2-bit data) to/from each memory cell. Because flash memory devices are now being required to support a variety of operations, the page buffer circuit 14 may support additional operations such as, for example, a cache program operation, and a page copyback operation. The cache program operation includes an operation wherein while data of one page is programmed, data to be stored for the next page is loaded on the page buffer circuit 14. The page copyback operation includes an operation wherein data stored in any page is moved to another page through the page buffer circuit 14, without being outputted to a circuit external to the page buffer circuit 14.

A plurality of page buffers may be provided in the page buffer circuit 14. Furthermore, one or more latches may be provided in each of the page buffers. Each of the page buffers stores cell data sensed at a sense node in a latch during a normal read operation or a page copyback operation. In addition, each page buffer also stores data to be programmed in a latch during a normal program operation or a cache program operation. The time at which data may be stored in a latch may be controlled by a control logic block (not shown) provided outside the NAND flash memory device 10. In addition, each latch may store data using a power supply voltage as a source. In an event that all latches constructed in the page buffer circuit 14 are activated, current flowing along a data path may increase rapidly for a short period of time thereby causing a drop in power supply voltage.

In order to prevent a drop of a power supply voltage, the page buffers of the page buffer circuit 14 may be split into several groups (e.g., eight groups) of page buffers. Latches constructed in the groups of the page buffer group may be sequentially activated for very short intervals during an activation period. However, although the groups of the latches are sequentially activated, a power supply voltage may encounter a voltage drop caused by the load capacitance element in a page buffer. For example, when groups of latches are activated, a voltage applied to a latch node may drop below a trip point due to charge sharing between internal nodes connected to a latch. As a result, a data value stored in a latch may be inverted. This variation of data value stored in a latch may be called "latch noise".

The present disclosure is directed to overcoming one or more of the problems associated with the conventional flash memory devices.

SUMMARY OF THE INVENTION

One aspect of the disclosure includes a page buffer. The page buffer may comprise of a latch connected to a sense node at a first contact point. The page buffer may also comprise of a sensing circuit connected to the sense node at a second contact point, the sensing circuit being configured to sense cell data of the sense node. The page buffer may also comprise of a switch circuit which electrically connects the first contact point with the second contact point after the first contact point is charged by the latch.

Another aspect of the disclosure includes a page buffer. The page buffer may comprise of a first register circuit connected to a sense node at a first contact point. The page buffer may also comprise of a sensing circuit connected to the sense node at a second contact point, the sensing circuit being configured to sense cell data of the sense node. The page buffer may also comprise of a second register circuit connected to the sensing circuit. The page buffer may also comprise of a switch circuit which electrically connects the first contact point with the second contact point after the first contact point is charged by the first register circuit. The page buffer may also comprise of a data output circuit which outputs the sensed cell data.

Another aspect of the present disclosure includes a nonvolatile memory device. The memory device may comprise of a memory cell array including a plurality of memory cells. The memory device may also comprise of a page buffer circuit including a plurality of page buffers connected to the memory cell through a bitline. The memory device may also comprise of a control logic which controls the page buffers after splitting the page buffers into a plurality of groups of page buffers. Furthermore, each of the page buffers may comprise of a latch connected to a sense node electrically connected with a selected bitline, at a first contact point. Each of the page buffers may also comprise of a sensing circuit connected to the sense node at a second contact point, the sensing circuit being configured to sense cell data of the sense node. Each of the page buffers may also comprise of a switch circuit which electrically connects the first contact point with the second contact point, after the first contact point is charged by the latch, in response to the control of the control logic.

Yet another aspect of the present disclosure includes a nonvolatile memory device. The memory device may comprise of a memory cell array including a plurality of memory cells. The memory device may also comprise of a page buffer circuit including a plurality of page buffers connected to the memory cell through a bitline. The memory device may also comprise of a control logic which controls the page buffers after splitting the page buffers into a plurality of groups of page buffers. Furthermore, each of the page buffers may comprise of a first register circuit connected to a sense node electrically connected with a selected bitline, at a first contact point. Each of the page buffers may also comprise of a sensing circuit connected to the sense node at a second contact point, the sensing circuit being configured to sense cell data of the sense node. Each of the page buffers may also comprise of a second register circuit connected to the sensing circuit. Each of the page buffers may also comprise of a switch circuit which electrically connects the first contact point with the second contact point, after the first contact point is charged by the first register circuit. Each page buffer may also comprise of a data output circuit which outputs the sensed cell data.

Yet another aspect of the present disclosure includes a method of driving a page buffer. The method may comprise of charging a first contact point through a latch connected to a sense node. The method may also comprise of electrically connecting the first contact point with a second contact point connected to a sensing circuit which senses cell data of the sense node.

Another aspect of the present disclosure includes a method of driving a page buffer. The method may comprise of splitting a plurality of page buffers into a plurality of groups of page buffers. The method may also comprise of sequentially driving a plurality of latches in the plurality of groups of the page buffers at predetermined intervals. Furthermore, the plurality of latches may be sequentially driven by charging a first contact point through a latch connected to a sense node. The plurality of latches may also be sequentially driven by electrically connecting the first contact point with a second contact point connected to a sensing circuit which senses cell data of the sense node.

DETAILED DESCRIPTION OF EXEMPLARY EMBODIMENTS

The present invention will now be described more fully hereinafter with reference to the accompanying drawings, in which preferred embodiments of the invention are shown.

In an exemplary embodiment, a plurality of page buffers may be split into a plurality of groups of page buffers. Furthermore, a plurality of latches may be included in the groups of page buffers. These latches may be sequentially driven at predetermined intervals. Each page buffer may also include a sense node. A latch in a page buffer may connect to a sense node at a first contact point. Furthermore, a sensing circuit may connect to the sense node at a second contact point for sensing cell data of the sense node. In each of the page buffers, an electrical connection is made between the first contact point and the second contact point after the corresponding latch charges the first contact point. As a result, a value of data stored in a latch may be maintained even when charges migrate to the second contact point from the first contact point during the activation of the latch.

Figure 1:
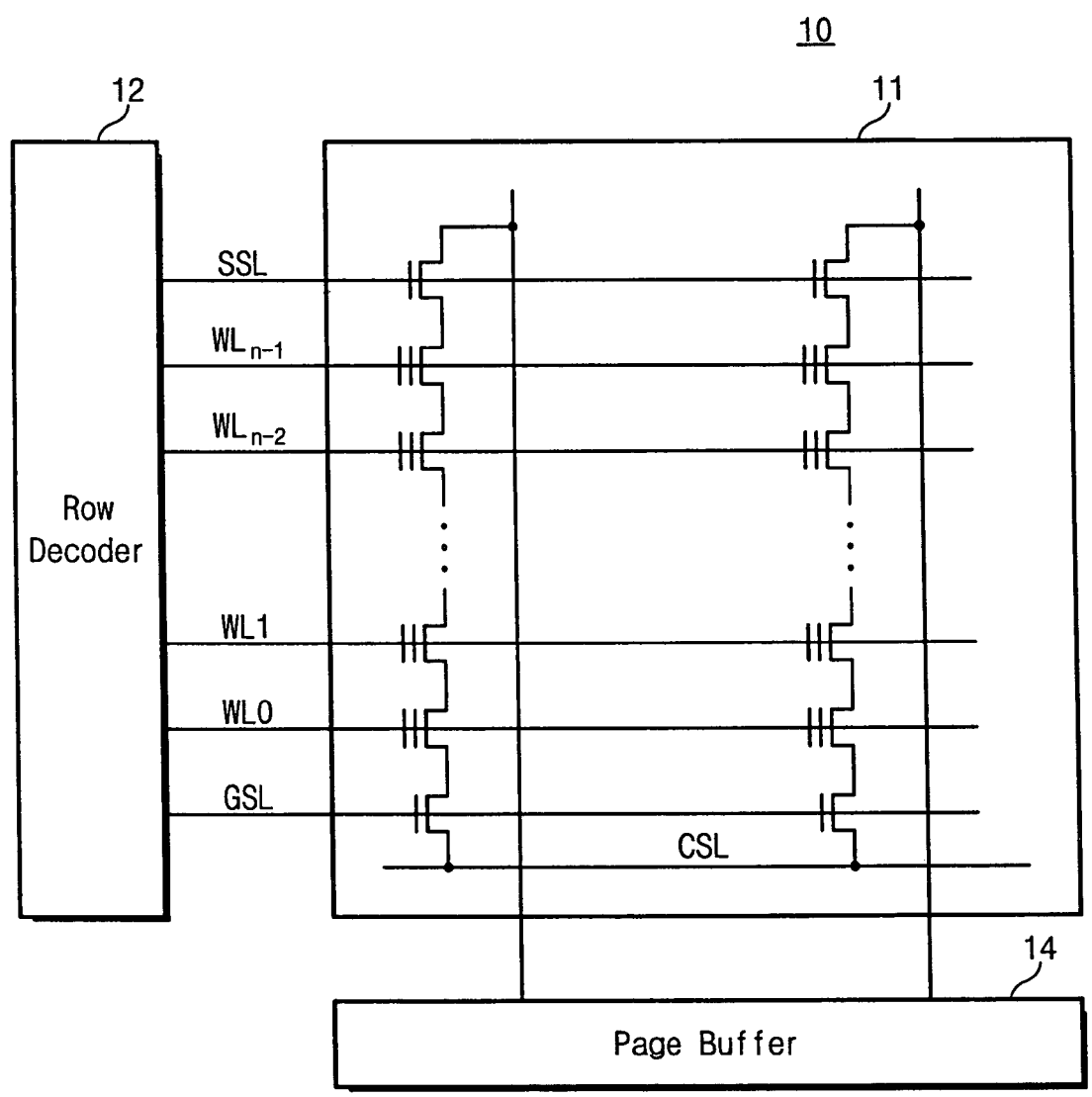
FIG. 1 is a block diagram of a conventional flash memory device.
Figure 2:
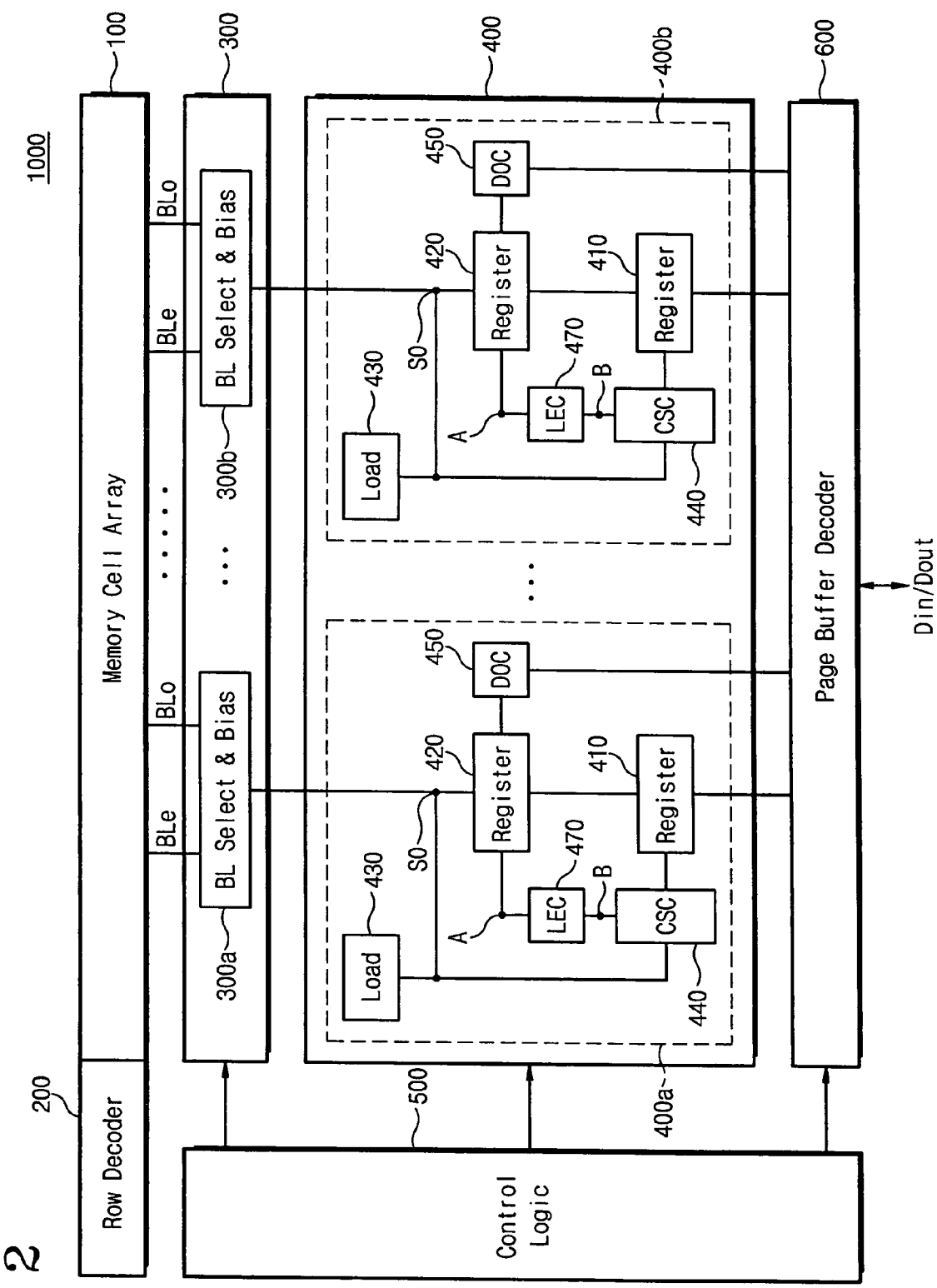
FIG. 2 is a block diagram of a flash memory device according to an exemplary disclosed embodiment.

FIG. 2 illustrates a nonvolatile memory device according to an exemplary disclosed embodiment of the present invention. Specifically, the nonvolatile memory device may be a NAND flash memory device.

Referring to FIG. 2, a flash memory device 1000 includes a memory cell array 100 for storing data information. The memory cell array 100 includes a plurality of memory cells arranged in a matrix of rows (or wordlines) and columns (or bitlines). Each of the memory cells may store 1-bit data or multi-bit data (e.g., 2-bit data). A row decoder circuit 200 selects rows of the memory cell array 100 and drives a selected row and unselected rows using corresponding wordline voltages. For example, for a program operation, the row decoder circuit 200 drives a selected row using a program voltage and drives unselected rows using a pass voltage. For a read operation, the row decoder circuit 200 drives a selected row using a reference voltage (e.g., 0 v) and drives unselected rows using a read voltage. The read operation includes a normal read operation and a verify read operation of multi-bit and single-bit program operation modes.

The flash memory device 1000 further includes a bitline select and bias block 300, a page buffer block 400, a control logic block 500, and a page buffer decoder block 600.

The bitline select and bias block 300 may select a number of bitlines in the memory cell array 100 in response to a control signal from the control logic block 500. For example, at program/read operations, the bitline select and bias block 300 may select the odd-numbered bitlines BLo or even-numbered bitlines BLe. This means that one row may include two pages—an odd page and an even page. The bitline select and bias block 300 may include a plurality of bitline select and bias circuits 300a-300b corresponding to bitlines of a page. Specifically, each of the bitline select and bias circuits 300a-300b selects one of a corresponding pair of bitlines BLe and BLo. As described above, one row is constituted of two pages. Nevertheless, those skilled in the relevant art will recognize that one row may be constituted of one page or at least two pages.

Based on the mode of operation, the page buffer block 400 may act as a sense amplifier or a writer driver. For example, during a program operation mode, the page buffer block 400 stores data input through the page buffer decoder block 600. Furthermore, the page buffer block 400 drives bitlines selected by the bitline select and bias block 300, using a program voltage (e.g., ground voltage) or a program inhibit voltage (e.g., power supply voltage), according to the stored data. During a read operation, the page buffer block 400 senses data from memory cells through bitlines selected by the bitline select and bias block 300. The sensed data is output to a data line bus or to an external circuit through the page buffer decoder block 600. In an exemplary embodiment, the program/read operations of the page buffer block 400 may be controlled by the control logic block 500.

The page buffer block 400 may include a plurality of page buffers 400a-400b respectively corresponding to the bitline select and bias circuits 300a-300b (or respectively corresponding to bitlines of one page). Each of the page buffers 400a-400b includes one or more latches in which sensed data and data to be programmed are stored. Since the page buffers 400a-400b have the same configuration, only elements associated with one page buffer (e.g., 400a) will be described below in detail.

As illustrated in FIG. 2, in an exemplary embodiment, a page buffer 400a includes two registers 410 and 420, a load circuit 430, a common sensing circuit (CSC) 440, a data output circuit (DOC) 450, and a switch circuit (LEC) 470.

The register 410 may be called a cache register, and the register 420 may be called a main register. The cache register 410 may include a latch (417 of FIG. 3) that may be used to store data to be programmed, and the main register 420 may include a latch (427 of FIG. 3) that may be used to store sensed data. A latch included in a main register may be called a main latch.

A sense node SO may be electrically connected with a bitline selected by the bitline select and bias circuit 300a. The load circuit 430 may be electrically connected with the sense node SO and may supply current to the sense node SO. The data output circuit 450 may output data stored in the main register 420 to the page buffer decoder circuit 600. The common sensing circuit 440 may be electrically connected with the main register 420 through the switch circuit 470. The common sensing circuit 440 may also be directly electrically connected with the cache register 410 and the sense node SO. The common sensing circuit 440 may offer a sense path to one of the registers 410 and 420 during a read operation. Furthermore, the common sensing circuit 440 may offer a data path between the registers 410 and 420 during a data dump period.

The switch circuit 470 may electrically interconnect the main register 420 and the common sensing circuit 440 in response to a control signal of the control logic block 500. As the main register 420 and the common sensing circuit 440 are electrically interconnected, a main latch in the main register 420 may be activated to hold data. In an exemplary embodiment, a plurality of main latches in the page buffer block 400 are not simultaneously activated but successively activated at very small intervals. Furthermore, a main latch activating operation may be divided into a first operation where a node A is charged through a main latch, and a second operation where the node A (see FIG. 3) is electrically connected with a node B (see FIG. 3) through the switch circuit 470 after node A is charged.

When a latch is activated, load capacitance elements Cap_A and Cap_B are applied between both ends (i.e., the nodes A and B) of the switch circuit 470. A ratio (Cap_A/Cap_B) of the load capacitance elements Cap_A and Cap_B is maintained over a predetermined level to reduce a voltage fluctuation resulting from charge sharing of the capacitance elements Cap_A and Cap_B. As a result, latch noise may be reduced and a value stored in a latch may be maintained. This will be described below in detail with reference to FIG. 3.

As described above, the flash memory device 1000 conducts a single-bit program operation as well as a multi-bit program operation, a cache program operation, and a page copyback operation by means of one page buffer configuration. Nevertheless, it will be appreciated by those of ordinary skill in the art that the page buffer 400a illustrated in FIG. 2 is not limited thereto.

Figure 3:
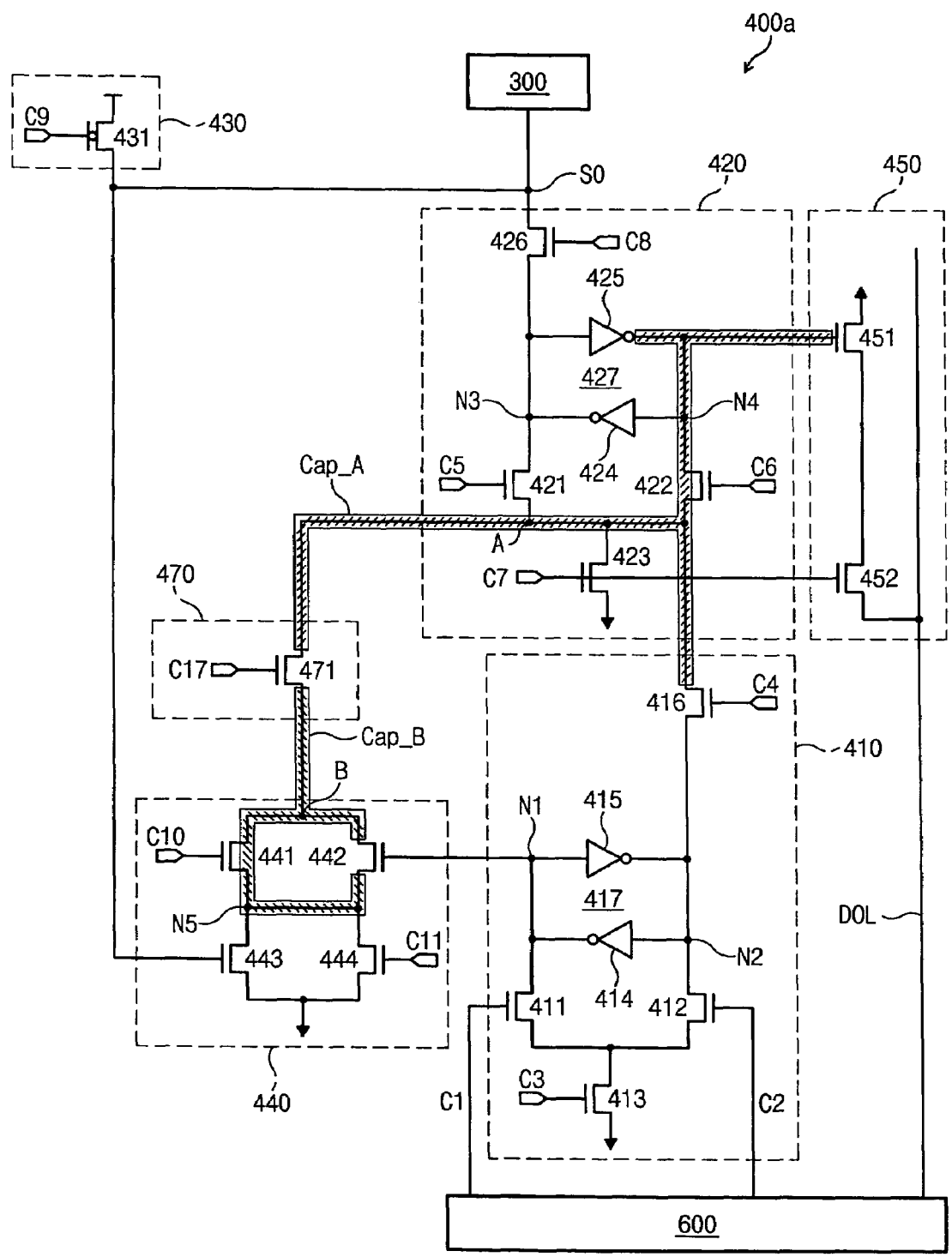
FIG. 3 is a circuit diagram of a page buffer according to an exemplary disclosed embodiment.

FIG. 3 is a circuit diagram of a page buffer 400a according to an exemplary embodiment of the present invention. The page buffer 400a includes the cache register 410, the main register 420, the load circuit 430, the common sensing circuit 440, the data output circuit 450, and the switch circuit 470.

The cache register 410 may include four NMOS transistors 411, 412, 413, and 416, and two inverters 414 and 415. The two inverters 414 and 415 constitute a latch 417. The NMOS transistor 411 has a drain connected to a latch node N1, a source, and a gate connected to receive a control signal C1. The NMOS transistor 413 receives a control signal C3 through the gate. The NMOS transistor 413 is coupled between the source of the NMOS transistors 411 and 412 and a ground. The NMOS transistor 412 has a gate connected to receive a control signal C2, a drain connected to a latch node N2, and a source connected to a drain of the NMOS transistor 413. The NMOS transistor 416 receives a control signal C4 through a gate and is coupled between the latch node N2 and a node A.

Data to be programmed may be stored in the latch 417 of the cache register 410. During a data load period where the data to be programmed is input, the control signals C1 and C2 have complementary logic levels. For example, when data '1' is loaded, the control signal C1 has a high level and the control signal C2 has a low level. Meanwhile, when data '0' is loaded, the control signal C1 has a low level and the control signal C2 has a high level. In order to initialize the latch 417, the control signals C1 and C2 are set to a high level and a low level while the control signal C3 is set to a high level, respectively. The control signal C3 may be provided from a control logic block 500 illustrated in FIG. 2 and activated during a data load period where data to be programmed is input. The control signal C4 may be provided from the control logic block 500 illustrated in FIG. 2 and activated during an initial sensing period of a most significant bit (MSB) program operation. In an exemplary embodiment, memory device 1000 may store 2-bit data "11", "10", "00", and "01" in one memory cell. In this case, a program operation is conducted twice. The former program operation is called a least significant bit (LSB) program operation, and the latter program operation is called an MSB program operation. Furthermore, the NMOS transistors 411, 412, and 413 selectively connect the latch nodes N1 and N2 to a ground voltage in response to the control signals C1, C2, and C3.

The main register 420 includes four NMOS transistors 421, 422, 423, and 426 and two inverters 424 and 425. The two inverters 424 and 425 constitute a main latch 427. The NMOS transistor 421 has a gate connected to receive a control signal C5, a drain connected to a latch node N3, and a source connected to a node A. The NMOS transistor 422 has a gate connected to receive a control signal C6, a drain connected to a latch node N4, and a source connected to a node A. The NMOS transistor 423 has a gate connected to receive a control signal C7, a drain connected to the node A, and a source grounded. The NMOS transistor 426 receives a control signal C8 through a gate and is coupled between a sense node SO and the latch node N3.

In an exemplary embodiment, the control signals C5, C6, and C7 are provided from the control logic block 500. The control signal C5 may be activated when data loaded on the cache register 410 is transferred to the main register 420 through the common sensing circuit 440. The control signal C6 may be activated when the main latch 427 is initialized, at normal sensing periods of read operations, and at verify periods (e.g., "00", "01", and "10" verify periods). The control signal C8 may be activated when data stored in the main latch is transferred to a bitline at a program period. However, even when the control signals C5, C6, C7, and C8 are activated, a sense path or a data path is not directly formed at the main latch 427. As will be described below, after the control signals C5, C6, C7, and C8 are activated to charge adjacent nodes connected to the main latch 427, a sense path or a data path is formed at the main latch 427 when the switch circuit 470 is turned on by an activate control signal C17. The main latch 427 starts to conduct a latch operation when the sense path or the data path is formed.

The common sensing circuit 440 includes four NMOS transistors 441, 442, 443, and 444. The NMOS transistor 441 has a gate connected to receive a control signal C10, a drain connected to a node B, and a source. The NMOS transistor 442 has a drain connected to the node B, a gate connected to the latch node N1 of the cache register 410, and a source. The NMOS transistor 443 having a gate connected to the sense node SO is coupled between a common source node N5 of the transistors 441 and 442 and a ground voltage. The NMOS transistor 444 has a gate connected to receive a control signal C11, a drain connected to the common source node N5, and a source grounded.

In an exemplary embodiment, the control signal C10 is activated at "01" and "10" verify periods, at an initial sensing period of an MSB program operation, and at a sensing period of a normal read operation. The control signal C11 is activated when data stored in the cache register 410 is transferred to the main register 420, i.e., at a data dump period. The common sensing circuit 440 does not offer a sense path or a data path to the main register until the control signal C17 is activated to electrically connect the common sensing circuit 470 with the main register 420 via the switch circuit 470 following the activation of the control signal C10 and C11.

The load circuit 430 includes a PMOS transistor 431 coupled between a power supply voltage and the sense node SO and is controlled by the control signal C9 from the control logic block 500. The data output circuit 450 includes two NMOS transistors 451 and 452, which are serially coupled between a ground voltage and a signal line DOL. The NMOS transistors 451 and 452 are controlled by a value of data stored in the main register 420 and the control signal C7, respectively.

The switch circuit 470 includes an NMOS transistor 471 coupled between the node A and the node B. The NMOS transistor 471 has a gate connected to receive the control signal C17, a drain connected to the node A, and a source connected to the node B. The control signal C17 is provided from the control logic block 500 illustrated in FIG. 2. In response to the control signal C17, the NMOS transistor 471 is switched during an activation period of the main latch 427 which will be described in detail later. According to the switch-on/off operations of the switch circuit 470, a sense path or a data path is formed between the main register 420 and the common sensing circuit 440. Thus, the main latch 427 is activated to conduct a latch operation.

The operation of the page buffer 400a illustrated in FIG. 3 will now be described with reference to a timing diagram of FIG. 4, which shows control signals for activating the main latch 427 of the main register 420. In an exemplary embodiment, periods where the main latch 427 is activated to hold data are a data dump period, an initial sensing period, a normal sensing period, and a verify sensing period (including "01" and "10" verify sensing periods and a "00" verify sensing period.) An activation operation of the main latch 427 during the normal sensing period of the page buffer 400a will be described as an example below.

Figure 4:
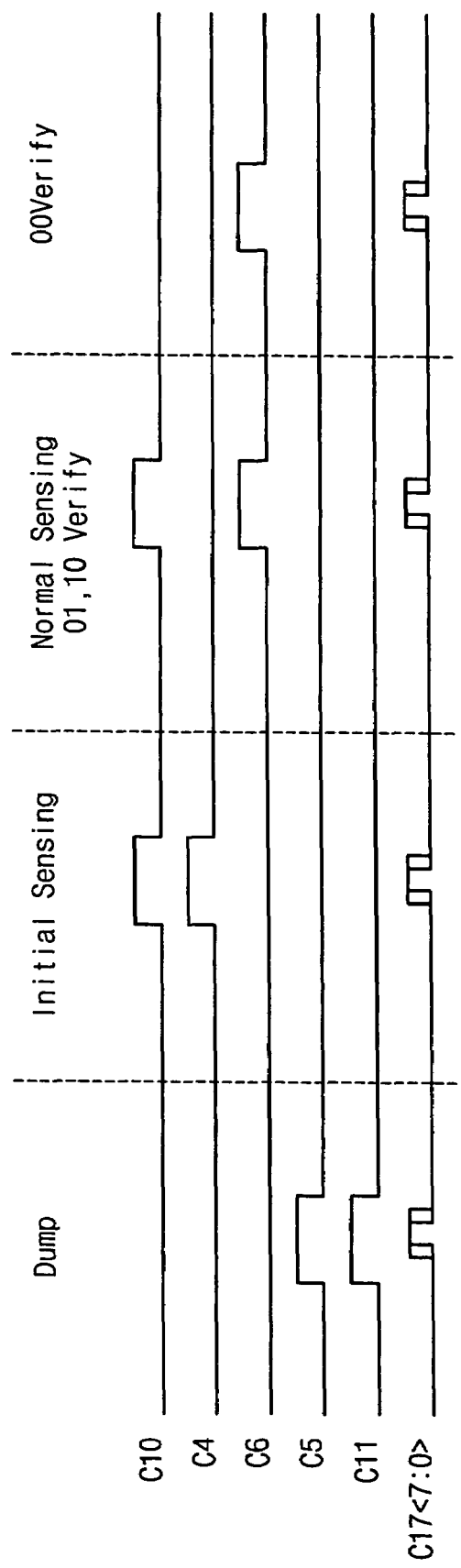
FIG. 4 is a timing diagram of the page buffer illustrated in FIG. 3 according to an exemplary disclosed embodiment.

Referring to FIG. 3 and FIG. 4, when a normal sensing period starts, activation of the control signals C6 and C10 is followed by activation of the control signal C17. The control signal C17 is used to form a sense path of main latches whose number is equal to the number of groups of page buffers included in the page buffer block 400. Thus, the control signal C17 is comprised of control signals C17<7:0>-C17<7:7> whose number is equal to the number of the groups of page buffers.

The transistor 422 connected to the main latch 427 and the transistor 441 included in the common sensing circuit 410 are turned on by the activated control signals C6 and C10. As the transistors 422 and 441 are turned on, nodes A and B disposed at both ends of the switch circuit 470 are filled with charges. When viewed from the nodes A and B, capacitance elements are Cap_A and Cap_B, respectively. When the transistors 422 and 441 are turned on, the capacitance element Cap_A of the node A has a value higher than or equal to that of the capacitance elements Cap_B of the node B. If a corresponding control signal C17<7:0> is activated among the control signals C17<7:0>-C17<7:7>, the transistor 471 of the switch circuit 470 is turned on to electrically interconnect the nodes A and B. As a result, a sense path is formed between the main latch 427 and the common sensing circuit 440 and the main latch 427 is activated to hold data. As the main latch 427 is activated, the data of the sense node is held by the latch 427 and sensed by the common sensing circuit 440. The sensed data is output to the exterior through the data output circuit 450.

As is well known to those skilled in the art, the sizes of the load capacitance elements Cap_A and Cap_B are related to the amount ΔV of voltage fluctuation resulting from charge sharing between nodes A and B. For example, as the sizes of the load capacitance elements Cap_A and Cap_B increase, the amount ΔV of the voltage fluctuation decreases. On the other hand, as the sizes of the load capacitance elements Cap_A and Cap_B decrease, the amount ΔV of the voltage fluctuation increases. Therefore, the capacitance element Cap_A of the node A may be set to be higher than the capacitance element Cap_B of the node B. For this reason, although charge sharing occurs between the node A and the node B, the amount ΔV of voltage fluctuation occurring at the node A may be small enough to have no effect on the main latch 247. Specifically, if the capacitance element Cap_A of the node A is larger than or equal to the capacitance Cap_B of the node B, voltages of latch node N3 and N4 are not affected even though charges migrate to the node A from the node B when the transistor 471 is turned on.

In this regard, a voltage provided from the main latch 247 may not drop below a trip point of the main latch 247. As a result, data stored in a main latch may be stably maintained to stably conduct operations such as, for example, single-bit and multi-bit program/read operations, a cache program operation, and a page copyback operation. Therefore, latch noise of a page buffer may be reduced to stably conduct single-bit and multi-bit program/read operations, a cache program operation, and a page copyback operation.

While the present invention has been described in conjunction with certain embodiments, it will be appreciated that modifications and variations may be resorted to without departing from the spirit and scope of the invention as those skilled in the art readily understand. Such modifications and variations are considered to be within the scope of the invention and the appended claims.

What is claimed is:

1. A page buffer comprising:
a latch connected to a sense node and a first contact point;
a sensing circuit connected to the sense node and a second contact point, the sensing circuit being configured to sense cell data of the sense node; and
a switch circuit which electrically connects the first contact point with the second contact point after the first contact point is charged by the latch.

2. The page buffer as recited in claim 1, wherein a capacitance element of the first contact point is larger than or equal to a capacitance element of the second contact point.

3. The page buffer as recited in claim 1, wherein the cell data is either one of multi-bit data and single-bit data.

4. A page buffer comprising:
a first register circuit connected to a sense node and a first contact point;
a sensing circuit connected to the sense node and a second contact point, the sensing circuit being configured to sense cell data of the sense node;
a second register circuit connected to the sensing circuit;
a switch circuit which electrically connects the first contact point with the second contact point after the first contact point is charged by the first register circuit; and
a data output circuit which outputs the sensed cell data.

5. The page buffer as recited in claim 4, wherein a capacitance element of the first contact point is larger than or equal to a capacitance element of the second contact point.

6. The page buffer as recited in claim 4, wherein the first register circuit comprises:

a first latch which stores the cell data; and
a first switch which electrically connects the first latch with the first contact point.

7. The page buffer as recited in claim 6, wherein the first switch is turned on before the switch circuit is turned on.

8. The page buffer as recited in claim 4, wherein the sensing circuit comprises:
a second switch which electrically connects the second contact point with the sense node; and
a third switch which electrically connects the second contact point with the second register circuit.

9. The page buffer as recited in claim 8, wherein the second and third switches are turned on before the switch circuit is turned on.

10. The page buffer as recited in claim 6, wherein the second register circuit comprises a second latch which stores data to be programmed, the data to be programmed being dumped to the first latch.

11. The page buffer as recited in claim 4, wherein the cell data is either one of multi-bit data and single-bit data.

12. A nonvolatile memory device comprising:
a memory cell array including a plurality of memory cells;
a page buffer circuit including a plurality of page buffers connected to the memory cell through a bitline; and
a control logic which controls the page buffers after splitting the page buffers into a plurality of groups of page buffers,
wherein each of the page buffers comprises:
a latch connected to a sense node and a first contact point, the sense node being electrically connected with a selected bitline;
a sensing circuit connected to the sense node and a second contact point, the sensing circuit being configured to sense cell data of the sense node; and
a switch circuit which electrically connects the first contact point with the second contact point, after the first contact point is charged by the latch, in response to the control of the control logic.

13. The nonvolatile memory device as recited in claim 12, wherein a capacitance element of the first contact point is larger than or equal to a capacitance element of the second contact point.

14. The nonvolatile memory device as recited in claim 12, wherein the memory cell stores either one of multi-bit data and single-bit data.

15. The nonvolatile memory device as recited in claim 12, wherein the memory cell is a NAND-type flash memory cell.

16. A nonvolatile memory device comprising:
a memory cell array including a plurality of memory cells;
a page buffer circuit including a plurality of page buffers connected to the memory cell through a bitline; and
a control logic which controls the page buffers after splitting the page buffers into a plurality of groups of page buffers, wherein each of the page buffers comprises:
a first register circuit connected to a sense node and a first contact point, the sense node being electrically connected with a selected bitline;
a sensing circuit connected to the sense node and a second contact point, the sensing circuit being configured to sense cell data of the sense node;
a second register circuit connected to the sensing circuit;
a switch circuit which electrically connects the first contact point with the second contact point after the first contact point is charged by the first register circuit; and
a data output circuit which outputs the sensed cell data.

17. The nonvolatile memory device as recited in claim 16, wherein a capacitance element of the first contact point is larger than or equal to a capacitance element of the second contact point.

18. The nonvolatile memory device as recited in claim 16, wherein the first register circuit comprises:
a first latch which stores the cell data; and
a first switch which electrically connects the first latch with the first contact point.

19. The nonvolatile memory device as recited in claim 18, wherein the first switch is turned on before the switch circuit is turned on.

20. The nonvolatile memory device as recited in claim 16, wherein the sensing circuit comprises:
a second switch which electrically connects the second contact point with the sense node; and
a third switch which electrically connects the second contact point with the second register circuit.

21. The nonvolatile memory device as recited in claim 20, wherein the second and third switches are turned on before the switch circuit is turned on.

22. The nonvolatile memory device as recited in claim 18, wherein the second register circuit comprises a second latch which stores data to be programmed, the data to be programmed being dumped to the first latch.

23. The nonvolatile memory device as recited in claim 16, wherein the cell data is either one of multi-bit data and single-bit data.

24. The nonvolatile memory device as recited in claim 16, wherein the memory cell is a NAND-type flash memory cell.

25. A method of driving a page buffer, comprising:
charging a first contact point through a latch connected to a sense node; and selectively connecting the first contact point with a second contact point connected to a sensing circuit which senses cell data of the sense node.

26. A method of driving a page buffer, comprising:
splitting a plurality of page buffers into a plurality of groups of page buffers; and
sequentially driving a plurality of latches in the plurality of page buffers at predetermined intervals, wherein the plurality of latches are sequentially driven by:
charging a first contact point of each page buffer through a latch connected to a sense node; and
selectively connecting the first contact point with a second contact point of each page buffer connected to a sensing circuit which senses cell data of the sense node.

27. The method as recited in claim 26, wherein the sensed cell data is stored in the latch.

28. The method as recited in claim 26, wherein a capacitance element of the first contact point is larger than or equal to a capacitance element of the second contact point.

* * * * *